Dec. 19, 1933.  J. T. SUTLIFF  1,940,378
LUBRICATED GAS STOP
Filed Nov. 18, 1929
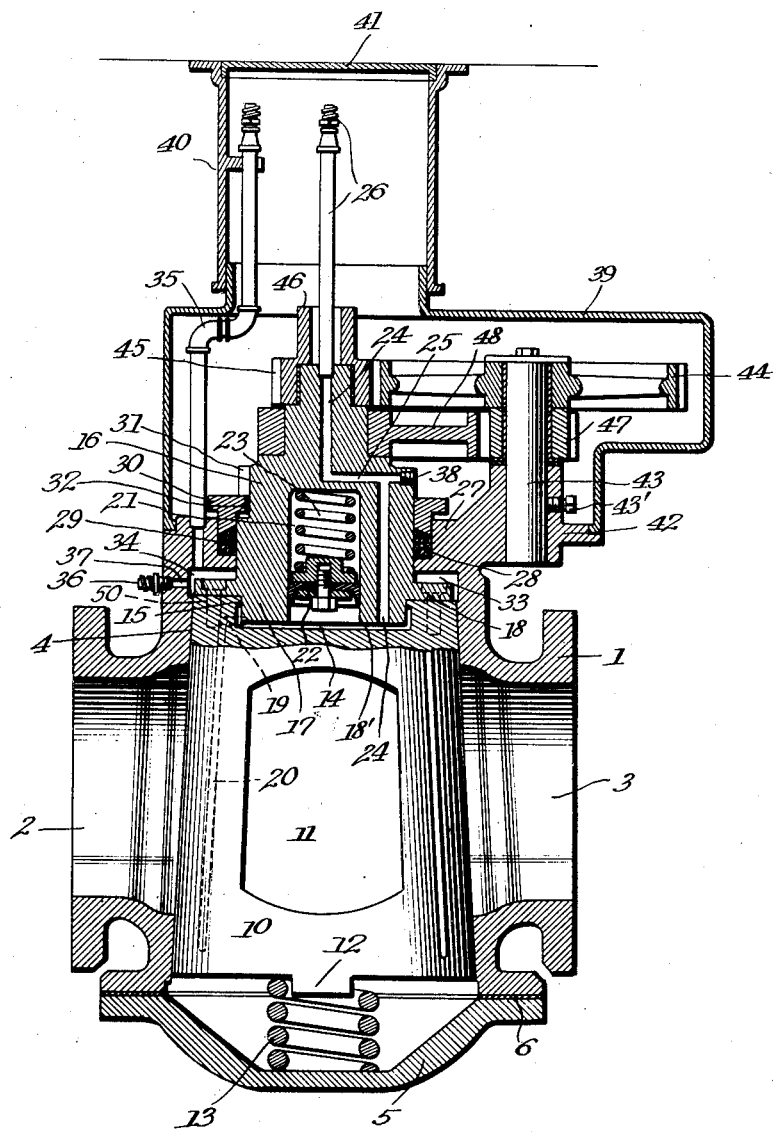
Inventor
James T. Sutliff
By Cullman, Bryant & Darby
Attorneys Patented Dec. 19, 1933

1,940,378

UNITED STATES PATENT OFFICE 1,940,378

LUBRICATED GAS STOP

James T. Sutliff, Decatur, Ill., assignor to Mueller Co., Decatur, Ill., a corporation of Illinois Application November 18, 1929
Serial No. 408,025

5 Claims. (Cl. 251—93)

This invention relates to an automatic lubricated stop construction adapted for use in connection with fluid control and more specifically gaseous fluids.

It is an object of the invention to provide for lubrication of the stop or valve and to this end a constant source of lubricant under pressure is made available.

Moreover, in constructions of this type, there has been a tendency towards sticking and it is an object of the invention therefore when this contingency happens, that means be provided for rapidly and effectively displacing the valve from its seat.

An additional object of the invention is to provide a lubricated stop construction wherein the valve plug in closed position will act as a complete seal to fluid flow.

In the drawing:

The figure is a sectional view of the invention.

The construction comprises the usual casing 1 having an inlet 2 and outlet 3. An intermediate valve seat 4 is provided which, as shown in the drawing, is tapered, although not necessarily so.

The casing at its lower end is closed by a member 5, which is secured to the casing in any suitable manner and between which and the casing is interposed a washer 6. The bottom 5 can be removed as required.

The valve plug is indicated as a whole at 10 and as usual, is provided with a through opening 11. The valve plug, as shown, is tapered to conform to the tapered contour of the seat.

At its lower end, the valve plug is provided with a projection 12 which forms a bearing or holding means for a spiral spring 13, which engages the bottom of the plug and bears against the interior of the member 5 to urge the plug normally upwardly into engagement with its seat 4.

At its upper end, the plug is recessed as shown at 14, such recess being preferably circular, and the plug is provided with a flange 15, which is preferably square, hexagonal or some other irregular shape and defines the entrance to the recess 14.

The plug 10 carries at its upper end a removable head 16. The lower portion 17 of the head 16 is square, hexagonal or of irregular contour conforming to the contour of the flange 15, so that as the head is turned, it will act as a key and turn the plug 10. The extent of the entrance of the head within the recess 14 is limited by a laterally extending circular flange 18 formed preferably integral with the head 16, which rests upon the top of the plug.

It will be understood that the flange 15 may be omitted and the lower portion 17 may be made smooth and cylindrical. The key action or cooperation between the lower portion 17 of the head and the flange 15 will then not be employed, and instead the circular flange 18 will be bolted to the top of the plug by a series of spaced bolts 50. A suitable washer or gasket should be interposed between the underside of the flange 18 and the adjacent top of the plug so that the bolted joint will be liquid-tight. This is the preferred form of the invention.

When the lower portion of the head 16 is positioned within the recess 14, it will be observed upon reference to the drawing, that the enclosed portion of the head is spaced from the side walls and bottom of the recess. This defines a cup-shaped passage 18' about the head and communicating therewith are radial openings 19 formed in the plug, which communicate with longitudinal grooves 20, also formed in the plug on the exposed surface thereof.

The head 16 is provided with a recess 21, which communicates with the space defined by the lower portion of the head in the recess 14. Mounted within the head is a piston member 22, which is forced outwardly by means of a spiral spring 23. Formed in the head is a longitudinal passageway indicated at 24, which, as shown, extends laterally at 25 and communicates with the recess 14 and the passageway defined between the plug and head. At its upper end, the passage 24 is provided with a lubricant connection preferably of the alemite type indicated at 26.

It will, moreover, be understood that the extent to which the lower end of the head 17 projects into the plug can be regulated to a greater or less degree to determine the size of the cup-shaped passage 18', and in some cases it may be desired not to have the head project into the opening at all. In such cases, the opening 14 will define with the lower end of the head a chamber in which lubricant may be retained under pressure. In such cases, of course, there will be no cup-shaped passage, but the chamber formed by the opening and the lower end of the head will have communication with a source of lubricant and with the passageways 19 and 20, as described.

Thus, lubricant supplied to the connection 26 will pass down through the passageway 24 into the space or passageway 18' and will fill the radial and longitudinal passageways 19 and 20, whence it will accumulate within the recess 21 in the head, and since the lubricant is supplied under pressure, it will act to retract the piston against the pressure of the spring 23.

When a sufficient quantity of fluid has been stored in the recess 21, the lubricant supply can be discontinued from the connection 26. It will be clear that the spring acting upon the piston will constantly force lubricant stored in the recess 21 through the space or passageway 18' into the radial openings and longitudinal grooves, so that the stop will be automatically lubricated.

The supply of lubricant in the reservoir can, of course, be replenished from time to time, by simply supplying the lubricant under pressure to the connection 26.

The casing 1 is provided with an internal circular horizontal flange indicated at 27. This flange, it will be observed upon reference to the drawing, defines a circular space or chamber with the adjacent horizontal flange 18 and the vertical walls of the head and casing. The flange 18, it will be observed, bears directly upon the top of the plug 10. The body portion of the head extends, as shown, through the flange 27 and is rotatable therein. The flange 27 is recessed as shown at 28 to receive a suitable packing 29 and a packing nut 30, which bears upon the packing and is secured to flange 27. The upper portion of the head is provided with a segmental recess 31 and the packing ring 30 is provided with a projection 32 engaging in said recess. The purpose of this construction is to act as a check to limit the rotation of the plug 10 to 90° so as to open and close the stop.

The chamber defined by the flange 18 and the flange 27 and the vertical walls is indicated at 33 and, it will be observed, that the vertical wall of the casing adjacent the chamber 33 is slightly enlarged as at 34. Communicating with the chamber 33 is a pressure connection for lubricant indicated at 35 which extends to an opening in the flange 27 communicating with the chamber 33. The pressure fitting 35, it will be seen, extends vertically substantially parallel to the pressure supply fitting 26. Also, communicating with the chamber 33 is a lateral pressure fitting 36, which communicates with an opening 37 in the casing which latter opens into the chamber 33.

The chamber 33 is a circular chamber and is substantially L-shaped, being defined by the flange 27, the enlarged vertical wall portion of the casing, the flange 18, the vertical wall of the plug, and a small portion of the adjacent upper end of the plug as shown.

It will be understood that the plug is normally urged toward its seat by the spring 13 and when it has been in use for a considerable period of time and it is desired to shut it off, or turn it on, there is a possibility that it will stick. In order to overcome the objections which are due to sticking, especially when handling fluids under very high pressure, some means must be provided for freeing or loosening the plug from its seat.

With the present invention, lubricant may be either supplied under pressure to the fitting 35 or the fitting 36, whence it will enter the chamber 33 and act to force the plug 10 downwardly against the action of the spring 13 and dislodge it so that easy turning is possible. Moreover, since there is a circular space between the end of the periphery of the flange 18 and the wall of the housing, the pressure will exert a lateral force, also acting to reinforce or accelerate the loosening or freeing of the plug.

Communicating with the lateral portion of the longitudinal passageway 24 is a plug 38, which may be opened to permit excess lubricant to be withdrawn or to permit the construction to be cleaned.

A suitable shield or cover 39 is secured to the casing and conceals the various operating parts thereof. A cover 40 is mounted on the shield and is provided with a removable lid 41. By removing the lid 41, the pressure fittings 26 and 35 are accessible.

The casing is provided with a bracket or bearing 42, within which is fixed a shaft 43 held from rotating by a suitable pin 43'. Rotatably mounted on the shaft is a gear 44 which meshes with a pinion gear 45, the latter being loosely carried upon the upper end of the head 16. The pinion gear 45 has an extension 46 which can be suitably engaged by a tool or other means, so as to rotate the gear 45 and the gear 44. Also rotatably mounted upon the shaft 43 is a gear 47 which may be integral with the gear 44 or keyed thereto. This gear 47 engages a segment 48 which is keyed to the upper end of the head 16. In this manner when the gear 45 is rotated it will rotate the gear 44, and simultaneously rotate the gear 47 to move the segment 48, which being keyed to the head will rotate the plug by reason of the bolted connection between the flange 18 and the top of the plug or the key connection between the lower end of the plug which fits into the opening 14.

As stated, the recess 31 and projection 32 will act to limit the movement of the plug so as to open and close the stop.

By reason of the construction employed, it will be seen that a constant and unfailing supply of lubricant will be stored within the head 16 under pressure of the spring operated piston which will force the lubricant into the passageway between the head and the plug, whence it will pass through the radial openings in the plug to the external longitudinal grooves 20.

Moreover, by reason of the pressure fittings 35 and 36 if the plug should stick as is frequently the case, if the lubricant or any form of hydraulic means be supplied under pressure through either of the fittings, it will build up a force within the chamber 33 to act upon the plug to dislodge it downwardly from its seat and there is also some lateral pressure exerted by reason of the L-shaped contour of the chamber.

It has been found that the construction described and illustrated is very effective and it will be understood that the appended claims are considered to possess a scope sufficient to comprehend various modifications and alterations which may be resorted to.

I claim:

1. A device of the class described comprising a valve casing having a valve seat, a plug engaging said seat, a recess in the top of the plug, a head detachably received in said recess and spaced from the bottom and side walls to define a distributing passageway, openings communicating with said passageway and with longitudinally extending grooves disposed in the exterior of the plug, a passageway for lubricant extending through said head and communicating with said distributing passageway, means for supplying lubricant under pressure to said last mentioned passageway, a chamber formed between the head and casing above the plug, and means independent of said lubricating means for building up hydraulic pressure in said chamber to move the plug axially.

2. A device of the class described comprising a valve casing having a valve seat, a plug engaging said seat, said plug having a central recess in the top thereof, a head fixed to the plug and received in said recess to define a relatively narrow cup-shaped passageway, means for supplying lubricant under pressure to said passageway, radial openings communicating with said passageway and with longitudinal grooves formed in the seating surface of the plug, said passageway serving to distribute lubricant to said grooves, and separate means for hydraulically moving the plug axially.

3. A device of the class described comprising a valve casing having a valve seat, a plug engaging said seat, said plug having a central recess in the top thereof, a head carried by the plug and received in said recess to define a relatively narrow cup-shaped passageway, means for supplying lubricant under pressure to said passageway, radial openings communicating with said passageway and with longitudinal grooves formed in the seating surface of the plug, said passageway serving to distribute lubricant to said grooves, a closed chamber defined by said casing and plug, and separate means for building up hydraulic pressure in said chamber to move the valve axially.

4. A valve of the class described comprising a casing having longitudinally disposed inlet and outlet openings and a transverse port constituting a valve seat, a rotary plug mounted in said transverse port and engaging said valve seat for controlling the flow of the fluid through the casing, means for actuating said plug, yieldable means associated with one end of the plug for urging the latter into engagement with the valve seat, the opposite end of the plug having a recess, a head removably mounted on said plug and having a portion extending into said recess to form a passage therebetween, said plug having an axially disposed opening communicating with said passage, a spring pressed plunger mounted in said opening, means supplying lubricant under pressure to said passage and opening, said plug having longitudinally disposed grooves in the outer wall thereof communicating with the passage, said plunger constituting means for insuring the lubricant in said opening being supplied to said grooves, said casing having an annular flange coacting with a complementary portion of said plug to form a pressure chamber, and means for introducing lubricant to said pressure chamber whereby to force the plug in a direction opposite to that of said yielding means to prevent sticking of the valve to its seat.

5. A valve of the class described comprising a casing having longitudinally disposed inlet and outlet openings and a transverse port constituting a valve seat, a rotary plug mounted in said transverse port and engaging said valve seat for controlling the flow of the fluid through the casing, means for actuating said plug, yieldable means associated with one end of the plug for urging the latter into engagement with the valve seat, the opposite end of the plug having a recess, a head removably mounted on said plug and having a flange mounted on said plug and its lower portion extending into said recess to form a passage therebetween, said plug having an axially disposed opening communicating with said passage, a spring pressed plunger mounted in said opening, means supplying lubricant under pressure to said passage and opening, said plug having longitudinally disposed grooves in the outer wall thereof communicating with the passage, said plunger constituting means for insuring the lubricant in said opening being supplied to said grooves, said casing having an annular flange coacting with the flange on said head to form a pressure chamber, and means separate and independent from said lubricant supplying means for introducing lubricant to said pressure chamber whereby to force the plug in a direction opposite to that of said yielding means to prevent sticking of the valve to its seat.

JAMES T. SUTLIFF.